United States Patent [19]

Jones

[11] Patent Number: 4,580,442
[45] Date of Patent: Apr. 8, 1986

[54] METHOD FOR LOCATING LEAKS IN NORMALLY DRY PORTIONS OF FIRE SPRINKLER SYSTEMS

[76] Inventor: Robert L. Jones, 864 NE. 12th, Bend, Oreg. 97701

[21] Appl. No.: 667,122

[22] Filed: Nov. 1, 1984

[51] Int. Cl.$^4$ .............................................. G01M 3/20
[52] U.S. Cl. ......................................... 73/40.7; 73/40
[58] Field of Search ................... 73/40.7, 37, 40, 40.7, 73/37; 239/565, 566

[56] References Cited

U.S. PATENT DOCUMENTS

| | | | |
|---|---|---|---|
| 2,878,392 | 3/1959 | Polito | 73/40.7 |
| 3,006,861 | 10/1961 | Browning et al. | 73/40.7 |
| 3,027,754 | 4/1962 | Alquist et al. | 73/40.7 |
| 3,060,725 | 10/1962 | Bernard | 73/40.7 |
| 3,085,423 | 4/1963 | Champion | 73/40.7 |
| 3,483,735 | 12/1968 | Packo | 73/40.7 |
| 3,483,736 | 12/1969 | Anderson | 73/40.7 |
| 3,683,675 | 8/1972 | Burton, Jr. et al. | 73/40.7 |
| 4,326,981 | 4/1982 | Molina | 252/301.19 |

FOREIGN PATENT DOCUMENTS

| | | | |
|---|---|---|---|
| 2817681 | 1/1979 | Fed. Rep. of Germany | 73/40.7 |
| 996888 | 2/1983 | U.S.S.R. | 73/40.7 |

*Primary Examiner*—Stewart J. Levy
*Assistant Examiner*—Hezron E. Williams
*Attorney, Agent, or Firm*—Chernoff, Vilhauer, McClung, Birdwell & Stenzel

[57] ABSTRACT

A method for locating points of leakage of air from a normally air-filled portion of the piping of a fire sprinkling system by filling the normally air-filled portion of the system with an aqueous solution of an efficient wetting agent, together with a water soluble dye, and applying pressure for a sufficient time to force dye through any leaking portions of the normally dry portion of the sprinkler system, and locating the leaks by visually observing leakage of the dye and wetting agent.

9 Claims, 1 Drawing Figure

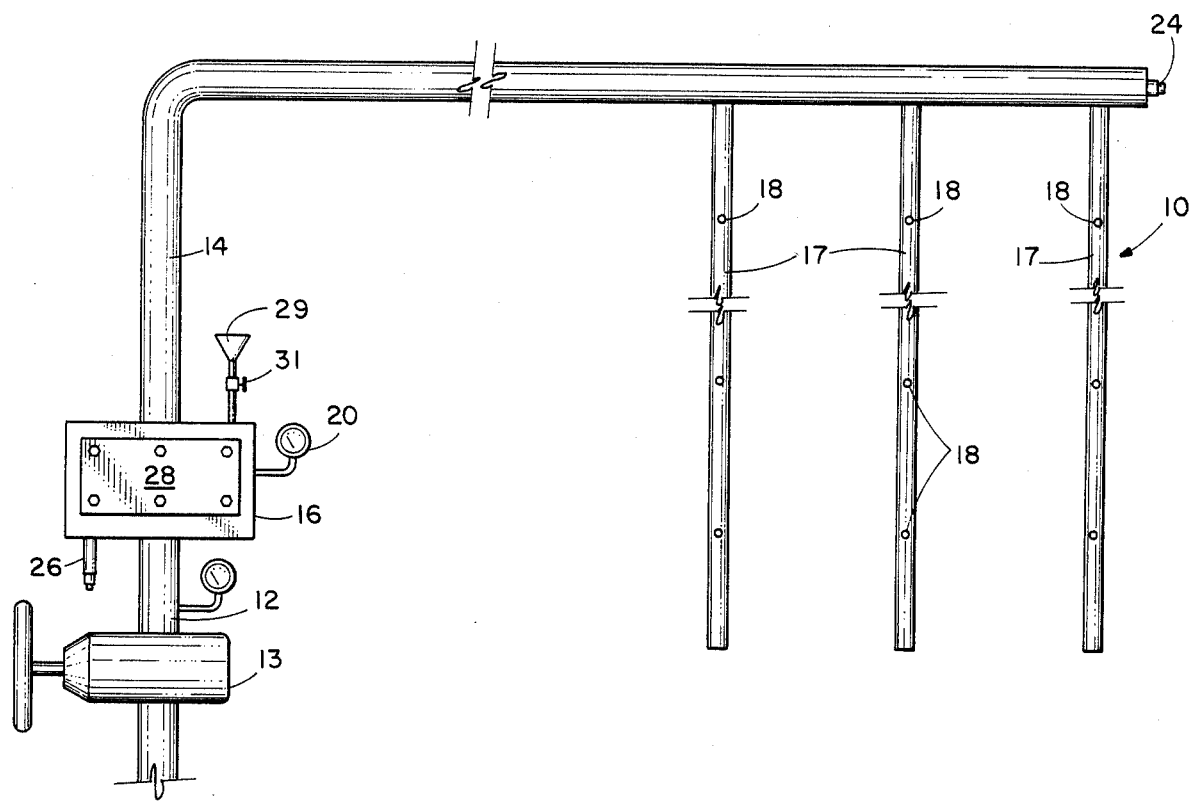

METHOD FOR LOCATING LEAKS IN NORMALLY DRY PORTIONS OF FIRE SPRINKLER SYSTEMS

BACKGROUND OF THE INVENTION

The present invention relates to automatic fire sprinkler systems for buildings, and particularly to a method for locating leaks in the normally dry portions of the piping of such systems.

For various reasons, including the desire to avoid corrosion and the possibility of water freezing within sprinkler pipes in unheated locations, automatic fire sprinkler systems often include a dry-pipe portion. Normally, the dry-pipe portion of such a sprinkler system contains air at a pressure sufficiently above atmospheric pressure to hold a pneumatically-controlled water control valve in a closed condition which prevents fire main pressure from forcing water into the dry-pipe portions of the sprinkler system. For example, in a commonly used system a pressure of 40 psig in the dry portions of the sprinkler system is normally used to keep the fire main water valve closed. The 40 psig pressure includes a safety factor, and ordinarily the pressure can drop as low as about 20 psig without allowing the water control valve to open; however, if the air pressure in the "dry" side falls to a low enough value the water control valve will open, allowing water to enter the normally dry piping. So long as the normally dry piping is airtight, the air pressure in that piping will remain high enough to hold the water pressure control valve closed, with only infrequent monitoring, such as a monthly check of pressure, being required.

Ordinarily, the sprinkler heads in the dry portion of such a system are sealed by heat-fusible plugs. When a fire occurs in the area protected by the sprinkler system the heat of the fire will fuse the plugs of sprinkler heads in the vicinity of the fire, allowing air pressure to escape. This release of pressure permits the water control valve to open and begins sprinkling of the fire through the affected sprinkler heads.

When the normally dry piping is not airtight, the normally present 40 psig air pressure within the normally dry piping falls gradually until the water control valve opens. Water under the pressure of the fire main then enters the normally dry portion of the sprinkler system. In warm climates this is not ordinarily a particularly serious problem. However, where there are leaks large enough to permit air pressure to be lost, water under the higher fire main pressure of 150 psig, for example, may leak in amounts great enough to cause damage.

What is more significant, however, is that in climates where freezing weather is possible or probable the normally water-filled portion of a sprinkling system is insulated or located within a heated portion of a building, but the normally dry portions may not be in heated locations. Water entering such portions of the sprinkler piping system may quickly freeze, with two potentially dangerous results. First, the pipes blocked by ice are incapable of providing water to sprinkle a fire should one occur. Second, and more common, pipes may be split by the freezing water, so that when the ice is thawed significant amounts of water damage may occur in the vicinity of such pipe failures. It is therefore very desirable to prevent the inadvertent opening of the water control valve in such a fire sprinkler system.

It has previously been very difficult to identify the location of minute leaks which can release air at a rate great enough to gradually reduce the air pressure in the "dry" portions of a sprinkler system below the minimum required to prevent the water control valve from opening. Such leaks may often be too small to be detected by the use of soap bubbles, or by hearing the outward rush of air through pinholes or cracks in the affected piping. While a hydrostatic test may quickly reveal the presence of leaks, it may not locate them, and a periodic check of pressure gauges is similarly ineffective in locating the opening through which air pressure is lost from the normally dry portions of a sprinkler system. It has therefore previously taken much experimentation and time to locate leaks in fire sprinkler systems of this type.

A part of the problem is that the air normally used to pressurize the normally dry portions of a fire sprinkler system can escape through holes through which ordinary water normally will not pass. Thus, even filling the pipe with water under pressure may not be effective to detect the location of leaks. This is particularly likely to be the case in humid weather, where filling the normally dry pipe with water may well result in the exterior surfaces of the piping becoming covered with water droplets, none of which actually originates from within the piping.

The general problem of detecting leaks in piping has been addressed in Packo U.S. Pat. Nos. 3,483,735 and 3,572,085. Packo teaches the use of visual indicant gas and similar agents which become visible as a color or smoke, or may be detected under ultraviolet or infrared detectors to provide an indication that a leak exists. The use of such gaseous mixtures in an installed fire sprinkling system, however, may be unduly difficult and can produce only a temporary indication of the location of a leak.

Burton, Jr. et al., U.S. Pat. No. 3,683,675, discloses a method of leak detection in which material is dispersed within a gaseous mixture inside a tank or container to be checked for leaks. However, this system is inapplicable for testing already-installed piping such as the normally dry portions of a sprinkler system, since it requires visual inspection of the interior of the container to detect the location of openings through which gas may escape.

What is needed, therefore, is a safe method for detecting the location of leaks in a gas-containing portion of a system such a fire sprinkler system. Such a method should be simple to use, provide an externally visible indication of the location of a leak, include only nontoxic and noncorrosive materials, and be reliably useful for locating extremely small openings.

SUMMARY OF THE INVENTION

The present invention fills the need for a safe, simple and reliable method for locating the avenue of leakage of gas from the normally dry portions of a fire sprinkler system, by providing a method including the steps of placing sufficient quantities of a concentrated wetting agent, such as a non-ionic detergent, and a concentrated water soluble dye within the normally dry portions of the system, pressurizing the normally dry portions of the system with water under fire main pressure and thereafter visually observing the exterior of the normally dry portions of the piping to locate the sources of leakage by visual detection of dye escaping through such sources of leakage. Admission of water into the normally dry piping dilutes the wetting agent and dye, forming a mixture which has a lower surface tension than ordinary fire main water and which is therefore capable of penetrating through minute openings, such as holes caused by corrosion or loose threaded pipe connections. The dye provides visible evidence of the location of leaking openings, but can be washed away to prevent confusion in later testing after completion of repairs.

It is therefore a principal object of the present invention to provide an improved method for detecting and locating the sources of leakage in a normally gas-filled dry portion of a fire sprinkler system.

It is another important object of the present invention to provide a method which is simple, safe, and reliable for detecting sources of leakage in a fire sprinkler system.

It is an important feature of the present invention that it includes the use of a wetting agent to cause water to leak through openings which are too small to permit passage of plain water, so that water under pressure can be used to detect openings through which gas might leak, but which normally would not permit passage of water.

It is another important feature of the method of the present invention that it includes the use of dye to cause a liquid which leaks from within piping being tested to leave an easily visible indication of the origin of leakage.

It is an important advantage of the present invention that it makes it possible to locate leaks in a fire sprinkler system much more easily than has been possible previously.

It is another advantage of the present invention that it enables the normally dry portion of a fire sprinkler system to be sealed at a much lower cost than has been possible previously.

The foregoing and other objectives, features and advantages of the present invention will be more readily understood upon consideration of the following detailed description of the invention taken in conjunction with the accompanying drawings.

BRIEF DESCRIPTION OF THE DRAWING

The single FIGURE shows, in simplified form, a typical automatic fire sprinkler system for which the method of the present invention is useful.

DETAILED DESCRIPTION OF THE INVENTION

The present invention is a method of testing the normally-dry portions of the piping of a fire sprinkler system such as the system 10 shown in the FIGURE, in which a portion 12 of the piping is normally filled with firefighting water under pressure and is isolated from a normally dry portion 14 of the sprinkler system piping by a shutoff valve 13 and a control valve 16. The normally dry portion 14 of the sprinkler system 10 includes several branch lines 17 of sprinkler pipe which are generally horizontal and extend along the ceiling of a sprinkler-protected area. A number of sprinkler nozzles 18 are fitted in the branch lines 17 of the normally dry portion 14 of the system 10 at appropriate locations to sprinkle water to extinguish fires which might occur in the area protected by the sprinkler system 10. The sprinkler nozzles 18 typically are sealed shut by a plug which may be fusible at a low temperature, or may be held in place by a temperature-sensitive element. The sprinkler nozzles 18 are typically fitted into the piping by normal pipe fitting threads and fixtures, which are potential locations of air pressure leaks in the normally dry portion 14. Drain openings 24 and 26 are provided at low points or ends of lines in the normally dry portion 14 and at the control valve 16, respectively.

A pressure gauge 20 is usually provided to observe the pressure of air or other gas which is contained within the normally dry section 14 of the sprinkler system. Normally, air pressure within the normally dry portion 14 of a system of this type is maintained at or near 40 psig, while the fire main water pressure in the normally wet portion 12 is typically around 150 psig. The air pressure in the normally dry portion 14 of the system keeps the control valve 16 closed, excluding water from the normally dry portion 14 of the piping.

When a fire in the vicinity of one of the sprinkler nozzles 18 causes a high enough temperature, the fusible plug or other temperature-sensitive element permits that particular sprinkler nozzle 18 to open, releasing the gas pressure within the normally dry portion 14 of the system 10. This reduction of the gas pressure in the dry portion 14 of the system is sensed by the control valve 16, which opens in response, admitting water under fire main pressure into the normally dry portions 14 of the system 10, and particularly to the opened sprinkler nozzle 18.

If the gas pressure in the normally dry portion 14 of the system is permitted to fall below the minimum operating pressure, for example 20 psig, of the control valve 16 without a sprinkler nozzle 18 having been opened by a fire, the control valve 16 will open and fire main pressure will force water into the normally dry portions 14 of the piping of the sprinkler system. Since gradual loss of pressure can be detected by the gauge 20, it is possible in some cases to avoid such unwanted opening of the control valve 16 by periodically monitoring the pressure indicated by the gauge 20 and adding air as necessary to maintain the pressure at a sufficiently high level. However, it has heretofore been difficult to discover the location of small leaks which only permit the pressure within the normally dry portions of the piping to drop slowly, maintaining the risk of unwanted opening of the control valve 16.

In order to locate such small leaks in accordance with the present invention, then, the main water supply shutoff valve 13 is closed, blocking the pressurized fire main water from the automatically operated water control valve 16 and from the normally dry portion 14 of the system 10. The air pressure within the normally dry portion 14 is then relieved. (The water control valve 16 is preferably reset to the closed condition at this time, although it is not absolutely necessary to do so.)

A mixture of concentrated water soluble dye of an easily visible color and a concentrated liquid wetting agent is introduced into the normally dry portions of the piping, preferably by pouring it into the control valve 16. This may be accomplished in some control valves by pouring it into a filler opening 29 protected by a valve 31. In other valves it may be necessary to remove an access cover 28 and pour the concentrated dye and wetting agent mixture into the control valve 16 through the access opening. Once this mixture has been introduced into the system, the access cover 28 is replaced, if it has been opened, or the valve 31 is closed tightly.

Thereafter, the main water supply shutoff valve 13 is opened slowly, admitting fire main water into the normally dry portion 14, mixing with and distributing the wetting agent and dye throughout the normally dry portion 14 of the sprinkler system 10 and thus applying the normal fire main water pressure to the system. (If the water control valve 16 had been reset to the closed condition during addition of the concentrated dye and wetting agent, it will trip open upon opening of the shutoff valve 13.) Although the slope of the sprinkler piping normally makes it unnecessary, in some sprinkler systems it may be necessary to bleed air from the normally dry portion 14 to fill it with the wetting agent and dry solution by opening drain openings 24.

The sprinkler system 10 is allowed to remain pressurized for a time sufficient to visually locate any leaks, which may be present at threaded junctions in the piping, or at other locations where piping may have minute cracks. At the locations where leakage is occurring, the wetting agent permits the water and dissolved dye to leak to the outside of the pipes of the normally dry portion 14, where it becomes visible. Often it is possible to detect and locate leaks within a period of a few minutes, although in some cases it may be necessary to leave the system under pressure for as long as several hours.

Once the origin of leakage has been detected and located, the main water valve 13 is closed and the system is drained, using the drains 24 and 26. Required repairs are accomplished to stop the leakage of the normally dry portions 14, and the system may then be retested to determine whether any leakage remains after such repairs.

While various wetting agents may be satisfactory, it has been discovered that a non-ionic detergent with the ability to significantly reduce the surface tension of water is desirable since its performance is unlikely to be affected by the hardness of firefighting water. For example, an aqueous solution of 30 percent, by weight, of nonylphenoxy polyethoxy ethanol, a non-ionic detergent which is completely soluble in water and is biodegradable, has been found to be satisfactory when supplied in the quantity of one quart per 100 gallons capacity of the normally dry portion 14 of the sprinkler system 10. This detergent, even in concentrations as small as 0.01 percent, causes a reduction of surface tension of water to about 30 dynes/cm, and is capable of further reducing the surface tension when mixed with water in greater concentrations.

A suitable dye should be easily soluble in cold water and yet easily visible when diluted by up to 200 parts water. A dye which has been found to be satisfactory for use in accordance with the method of the invention is a direct red dye marketed by Associated Chemists, Inc. of Portland, Ore., under the name 303-3 Red Ink, whose active ingredient is known throughout the dye industry as direct red 81. This is a non-hazardous dye which is completely soluble in water, has a viscosity approximately the same as that of water, and has a pH of about 9.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for locating minute leaks in a normally dry portion of a first sprinkler system in which a pressurized gas is normally present in said normally dry portion and an automatic control valve is responsive to a drop in the pressure of said gas in said normally dry portion below a predetermined pressure to admit water into said normally dry portion in response to the gas pressure therein dropping below said predetermined pressure, the method comprising:
    (a) stopping the supply of sprinkler water normally available to said control valve;
    (b) introducing a first predetermined amount of a wetting agent and a second predetermined amount of a water-soluble dye into the interior of said control valve, said first and second predetermined amounts depending on the internal capacity of the normally dry portion of the sprinkler system;
    (c) thereafter admitting water under pressure into said control valve and through said control valve into said normally dry portion of said sprinkler system in an amount sufficient to substantially fill said normally dry portion, and continuing to apply pressure thereto; and
    (d) thereafter visually examining the exterior of the normally dry portion of the fire sprinkler system for evidence of escape of said dye.

2. The method of claim 1 wherein said first predetermined amount of said wetting agent is a quantity sufficient to significantly increase the ability of water to pass through small cracks and orifices when said first predetermined amount is diluted by enough water to substantially fill said normally dry portion of said sprinkler system.

3. The method of claim 1 wherein said first predetermined amount of said wetting agent is introduced into said normally dry portion in an amount sufficient to reduce the surface tension of the mixture of water, dye, and wetting agent resulting from step (c) to a value no greater than about 30 dynes/cm.

4. The method of claim 1 wherein said wetting agent is a non-ionic detergent.

5. The method of claim 1, including during step (c) applying fire main water pressure to said normally dry portion of said first sprinkler system through said automatic control valve.

6. The method of claim 1 including the further step of draining all of said water, wetting agent, and dye from said normally dry portions of said fire sprinkler system.

7. The method of claim 1 including prior to said step (a) the step of draining any water present in said normally dry portion of said sprinkler system.

8. The method of claim 1 wherein said wetting agent and said dye are introduced into said normally dry portion of said sprinkler system in concentrated form and said water is admitted during step (c) in an amount at least several times as great as each of said first and second predetermined amounts.

9. The method of claim 1 including after step (a) and before step (b) the steps of relieving the normal air pressure from within said normally dry portion and thereafter closing said automatic control valve.

* * * * *